United States Patent
Jones et al.

(10) Patent No.: US 9,454,198 B2
(45) Date of Patent: Sep. 27, 2016

(54) ELECTRICAL POWER TRANSMITTING CONTROLLER DEVICE AND ELECTRICAL POWER RECEIVING CONTROLLER DEVICE FOR USING IN A COMMUNICATION SYSTEM

(71) Applicant: ams AG, Unterpremstaetten (AT)

(72) Inventors: Oliver Jones, Graz (AT); Andrew Fewster, Cliddesden Nr Basingstoke (GB)

(73) Assignee: AMS AG, Unterpremstaetten (AT)

( * ) Notice: Subject to any disclaimer, the term of this patent is extended or adjusted under 35 U.S.C. 154(b) by 86 days.

(21) Appl. No.: 14/395,052

(22) PCT Filed: Mar. 5, 2013

(86) PCT No.: PCT/EP2013/054363
§ 371 (c)(1),
(2) Date: Oct. 16, 2014

(87) PCT Pub. No.: WO2013/156192
PCT Pub. Date: Oct. 24, 2013

(65) Prior Publication Data
US 2015/0071480 A1  Mar. 12, 2015

(30) Foreign Application Priority Data

Apr. 19, 2012  (EP) .................... 12164750

(51) Int. Cl.
H04R 25/00    (2006.01)
G06F 1/26     (2006.01)
H02J 7/00     (2006.01)
H04R 1/10     (2006.01)
H04M 1/60     (2006.01)

(52) U.S. Cl.
CPC ............ *G06F 1/26* (2013.01); *H02J 7/0044* (2013.01); *H04R 1/1041* (2013.01); *H04M 1/6058* (2013.01); *H04R 2420/09* (2013.01)

(58) Field of Classification Search
CPC ..... G06F 1/26; H02J 7/0044; H01M 1/6058; H04R 1/1041; H04R 2420/09
See application file for complete search history.

(56) References Cited

U.S. PATENT DOCUMENTS

| 2003/0078073 | A1* | 4/2003  | Lee ...................... H04M 1/215 455/557 |
| 2007/0072474 | A1  | 3/2007  | Beasley et al. |
| 2009/0179768 | A1* | 7/2009  | Sander ................... H04M 1/05 340/13.27 |
| 2010/0284525 | A1  | 11/2010 | Sander et al. |
| 2011/0103608 | A1* | 5/2011  | Wu ..................... H04M 1/6058 381/74 |

FOREIGN PATENT DOCUMENTS

DE    102011104268 A1    12/2012

* cited by examiner

*Primary Examiner* — Brian Ensey
(74) *Attorney, Agent, or Firm* — McDermott Will & Emery LLP

(57) ABSTRACT

A host device (10) may comprise an electrical power transmitting controller device (100), and an accessory device (20) may comprise an electrical power receiving controller device (200). After an identification and handshaking process to determine power requirements the power transmitting controller device (100) provides electrical power to the electrical power receiving controller device (200) to operate the accessory device. Coded communication data is transferred between the host device (10) and the accessory device (20) by a communication link. Power and communication are transferred over a single wire, such as an auxiliary pole (AUX) of a 3.5 mm jack interface (IO20).

14 Claims, 2 Drawing Sheets

ELECTRICAL POWER TRANSMITTING CONTROLLER DEVICE AND ELECTRICAL POWER RECEIVING CONTROLLER DEVICE FOR USING IN A COMMUNICATION SYSTEM

TECHNICAL FIELD

The invention is directed to an electrical power transmitting controller device for using in a host device to transmit electrical power to an electrical power receiving controller device of an accessory device. The invention is also directed to a host device to provide power to an accessory device. The invention also concerns an electrical power receiving controller device for use in an accessory device to receive electrical power from an electrical power transmitting controller device of a host device. The invention is further directed to an accessory device with receiving power from a host device. The invention is also related to a communication system in which power and data are transferred between a host device and an accessory device.

BACKGROUND

There is a plurality of communication systems in which a host device is coupled to an accessory device, wherein both devices are connected by a communication path. The host device may, for example, be configured as a mobile phone, a tablet PC or a multimedia player. The accessory device may be an earphone to play an audio signal, a display to render an image transferred to the display from the host device or a microphone to record speech data to be transferred to the host device.

Whereas in the past accessories have mostly been configured as passive devices, modern accessory devices are steadily gaining more intelligence and more independence so that they are no longer simply passive devices. Examples of such intelligent accessories are active headset, for example active noise-cancelling headsets or gaming headsets, sensor hubs, such as RFID tags and sensor devices, microphone-arrays or, for example, pico-projectors.

In mobile applications, three main connector families exist to provide an interface between accessory devices and host devices: USB connectors, 3.5 mm jack interfaces and custom connectors, for example Apple 30 pin connector. The most prolific and most used connector is the 3.5 mm jack interface (plug and socket). However, the limitation of the 3.5 mm jack is the number of connections. Three and four connections remain the mainstream. A fifth connection exists but is, however, not widely used and is not backward compatible. The standard 3.5 mm jack comprises four poles, particularly an LS1-pole to transfer audio data for a left channel, an LS2-pole to transfer audio data for a right channel, GND-pole to provide a ground connection and an AUX-pole for auxiliary connection. The AUX-pole in legacy products is often used to transmit speech microphone data and/or remote functions, such as call pickup, call drop, fast forward, fast rewind, volume up and volume down, from the accessory device to the host device.

Power to supply an accessory device provided from the 3.5 mm jack is usually limited to a few milliwatts which may be enough to bias a speech microphone in hands-free kits or power a remote control function found in certain dongles. However an intelligent accessory typically requires power in a range lower than 500 mW. The transfer of adequate power to operate intelligent accessory devices is not possible. The transfer of coded communication data with a data communication protocol between a host device and an accessory device is currently also not arranged via the auxiliary connection of the 3.5 mm jack interface. Thus, intelligent accessory solutions today require batteries to provide power and either wireless or other than 3.5 mm jack connections for communication by exchanging a bit stream comprising data words coded in a certain format.

It is desirable to provide an electrical power transmitting controller device for use in a host device to transmit electrical power to an electrical power receiving controller device of an accessory device, wherein power may be transmitted to the electrical power receiving controller device via a 3.5 mm jack interface which connects the host device and the accessory device. A further concern is to provide a host device to provide power to an accessory device wherein the host device and the accessory device are coupled by a 3.5 mm jack interface. Furthermore, it is desirable to provide an electrical power receiving controller device for use in an accessory device to receive power from an electrical power transmitting controller device of a host device, wherein the accessory device and the host device are coupled by a 3.5 mm jack interface. Furthermore, an accessory device with receiving power from a host device, wherein the accessory device and the host device may be coupled by a 3.5 mm jack interface is specified. Another concern of the present invention is to specify a communication system in which power and/or communication data may be exchanged between a host device and an accessory device coupled together by means of a 3.5 mm jack interface.

SUMMARY

An embodiment of an electrical power transmitting controller device for using in a host device to transmit electrical power to an electrical power receiving controller device of an accessory device, comprises a power delivering terminal to provide electrical power, wherein the power delivering terminal is arranged to be coupled to the electrical power receiving controller device of the accessory device. The electrical power transmitting controller device is arranged to detect whether the electrical power receiving controller device of the accessory device is coupled to the power delivering terminal, and whether the accessory device is arranged to be supplied with electrical power from the electrical power transmitting controller device to be operated. The electrical power transmitting controller device is arranged to provide electrical power at the power delivering terminal, if the electrical power transmitting controller device detects that the electrical power receiving controller device of the accessory device is coupled to the power delivering terminal and that the accessory device is arranged to be supplied with power from the electrical power transmitting controller device to be operated.

An embodiment of an electrical power receiving controller device for using in an accessory device to receive power from an electrical power transmitting controller device of a host device comprises a power receiving terminal to receive electrical power, wherein the power receiving terminal is arranged to receive power from the electrical power transmitting controller device of the host device to be supplied to the accessory device. The electrical power receiving controller device comprises a control unit to perform handshaking operations between the electrical power receiving controller device of the accessory device and the electrical power transmitting controller device of the host device. The electrical power receiving controller device may also comprise a controllable switch unit to selectively provide power received at the power receiving terminal to the accessory device after the handshaking operations are performed or to disconnect power from the accessory device before the handshaking operations are performed.

By means of the electrical power transmitting controller device which may be provided in a host device and the electrical power receiving controller device which may be provided in an accessory device, particularly an intelligent accessory device, a solution is proposed for sharing power and uni- or bidirectional communication channels between the host device and the accessory device through a 3.5 mm jack, while at the same time ensuring backward compatibility with legacy products.

When the electrical power transmitting controller detects that an accessory device is connected to the host device, a supplier identification code and/or an identification signature of the accessory device is queried by the electrical power transmitting controller device to detect the type of the accessory device. If it is detected that an accessory device is connected to the electrical power transmitting device, handshaking operations are performed between the power transmitting controller device and the power receiving controller device to determine, if an intelligent accessory device with the capability to receive supply power from the host device or a standard passive accessory device/standard active accessory device supplied with electrical power by a battery is coupled to the host device. If the power transmitting controller device detects that the accessory device is a standard accessory device no power is delivered by the power transmitting controller device or simply a bias voltage is provided. If the power transmitting controller device detects that an intelligent accessory with the capability to be power supplied from the host device is connected, the power transmitting controller device detects the voltage and power requirements of the accessory device.

Before transmitting power, the electrical power transmitting controller device of the host device validates that the accessory device is capable of accepting power and decides the level of voltage and current to allocate. The level of voltage and current to be generated by the power transmitting controller device is determined in dependence on the voltage supply required to operate the accessory device.

The electrical power transmitting controller device is arranged to permanently verify a connection status of the accessory device to the host device. If the electrical power transmitting controller device detects that the accessory device is uncoupled from the host device the provision of power is interrupted by the power transmitting controller. The electrical power transmitting controller device may also be arranged to verify the operation of the accessory device connected to the host device in real time to judge for any faults or degraded modes of operation, such as short-circuits or incorrect jack insertion. The provision of power is interrupted by the electrical power transmitting controller device when any faults or degraded modes of operation of the accessory device are detected. Furthermore, the electrical power transmitting controller device may be arranged to verify what kind/type of accessory device is connected to the host device and decides what information to transfer between the host and accessory device. The power transmitting device may detect the current configuration of the accessory device and may transfer an updated software as communication data to the power receiving controller device. The configuration may be updated during a start-up procedure or in real-time during the operation of the accessory device.

The communication between the host device and the accessory device can be performed in either voltage mode or current mode. If the electrical power transmitting controller device and the electrical power receiving controller device are configured to communicate in voltage mode, the electrical power transmitting controller device may modulate a communication protocol onto the power line through generation of leading and trailing edge slew-rate controlled square waves. A fixed frequency RTZ (Return to Zero) code may be used and allows limiting the effects of electromagnetic noise generation and DC offset build-up. A +/−300 millivolt dynamic range is preferred to ensure sufficient immunity to ground offsets and other coupled noise issues.

If the electrical power transmitting controller device and the electrical power receiving controller device are arranged to communicate together in current mode, the electrical power transmitting controller device of the host device or the electrical power receiving controller device of the accessory device modulate a current by a certain amount, wherein the amount is recognized and detected by the electrical power receiving controller device of the accessory device. This current is as small as possible to avoid unnecessary battery drain, however sufficiently consequent to ensure immunity from conducted and radiated noise.

The communication data are coded by the electrical power transmitting controller device and, in case of a bidirectional communication link, also by the electrical power receiving controller device so that the communication data may be transferred between the host device and the accessory device by several protocol coding. The electrical power transmitting controller device and the electrical power receiving controller device may be arranged to encode data signals, such as $I^2C$ data signals, so that the communication data is transferred by Manchester coding, Hammond coding or other more or less commonly used communication protocols.

Once the electrical power transmitting controller device of the host device has identified the accessory device, a voltage regulator or a voltage generator of the electrical power transmitting controller device generates the required voltage which is necessary to operate the accessory device and categorize the accessory device by a power drain capability. This information is then available for the host device to define battery life and/or prioritize features in case of transient power events. The voltage provided by the electrical power transmitting controller device to operate the accessory device may preferably be limited to 1.8 V maximum in order to ensure sufficient dynamic range in case of voltage modulation of the communication layer. In case of current modulation, the voltage provided by the electrical power transmitting controller device to operate the accessory device may preferably be limited to the power supply range of the host device.

The transfer of power and communication data with a data communication protocol between the host device and the accessory device may be performed by means of a 3.5 mm jack interface by which the host device and the accessory device may be coupled. In a preferred embodiment the auxiliary connection, i.e. the AUX-pole, of the 3.5 mm jack is used to transfer electrical power and to provide a uni- or bidirectional communication channel between the host device and the accessory device. Thus, power and communication data are transferred between the power transmitting controller device of the host device and the power receiving controller device of the accessory device over a single wire.

By using the electrical power transmitting controller device in the host device and the electrical power receiving controller device in the accessory device existing connectors and interface technology can be used without the need for specific developments, while removing the need for localized power sources, such as batteries, in (intelligent) accessory devices. The electrical power transmitting controller device and the electrical power receiving controller device may be used in communication systems, e.g. in audio products, and can also be used for sensors and remote control solutions.

It is to be understood that both the foregoing general description and the following detailed description present embodiments and are intended to provide an overview or a framework for understanding the nature and character of the disclosure. The accompanying drawings are included to provide a further understanding, and are incorporated into and constitute a part of this specification. The drawings illustrate various embodiments and, together with the description, serve to explain the principles and operation of the concepts disclosed.

DETAILED DESCRIPTION

Figure 1:
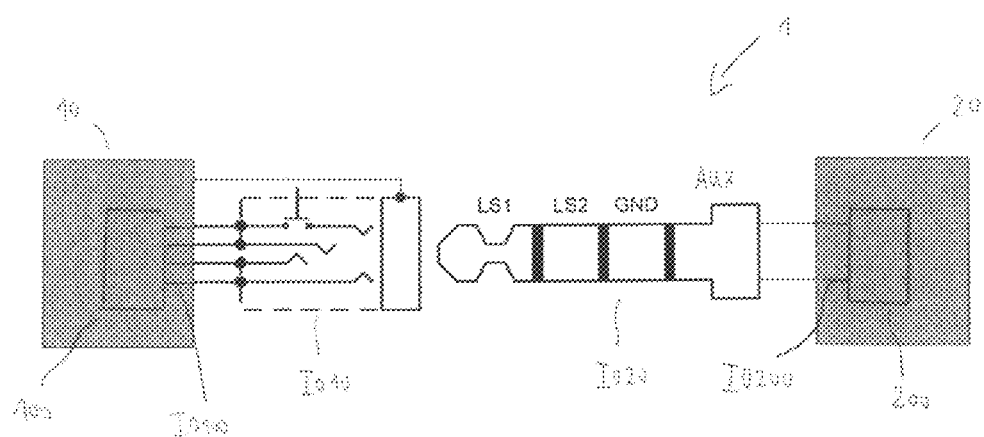
FIG. 1 shows a communication system comprising a host device and an accessory device being coupled by a 3.5 mm jack interface.

FIG. 1 shows a communication system 1 comprising a host device 10 and an accessory device 20 which may be coupled together by a plug and socket connection. The host device 10 comprises an external terminal IO10 which may be formed as a socket/female connector. The accessory device 20 comprises an external terminal IO20 which may be formed as an applicable plug/male connector, for example as a 3.5 mm audio jack interface. The external terminal IO10 is arranged to insert the 3.5 mm jack (plug) IO20 of the accessory device 20. Thus, the host device 10 and the accessory device 20 may be coupled by inserting the 3.5 mm jack (plug) IO20 into the corresponding socket IO10 of the host device 10.

The host device 10 may be configured, for example as a mobile phone, a tablet PC or a multimedia player. The accessory device may be any accessory using a 3.5 mm jack interface. The accessory device 20 may be formed as a standard passive headset, a standard active headset including a battery to supply power for operating the headset or as an intelligent accessory device, for example an intelligent active headset, a sensor hub, a microphone array or a pico-projector. The intelligent accessory may communicate with the host device by exchanging communication data in the format of coded data words transferred as a bit stream.

The 3.5 mm jack IO20 is configured as a four-pole connector comprising a pole LS1, a pole LS2, a ground connection pole GND and an auxiliary pole AUX. Assume the accessory device is a headset, the pole LS1 may be arranged to transfer audio signals to a left loudspeaker of the accessory device 20, and the pole LS2 may be arranged to transfer audio data to a right loudspeaker. The pole GND may be used to connect the accessory device to a reference potential, for example the ground potential. If the accessory device is a standard passive headset or a standard active headset, the auxiliary pole AUX may be used to transmit speech microphone data and/or remote functions from the accessory device 20 to the host device 10. In case of an intelligent accessory device, the AUX pole is used to transfer electrical power from the host device to the accessory device to supply the accessory device with power to be operated and coded communication data, such as a stream of data words, to create a bidirectional communication link between the host device and the accessory device.

The host device 10 comprises an electrical power transmitting controller device 100 comprising a power delivering terminal IO100 to provide electrical power generated by the electrical power transmitting controller device 100. The power delivering terminal IO100 is coupled to the external terminal IO10. The power delivering terminal IO100 and the external terminal IO10 may be arranged such that power generated by the electrical power transmitting controller device 100 is provided to the auxiliary pole AUX of the 3.5 mm jack IO20, if the plug IO20 is inserted into the socket IO10. The accessory device 20 comprises an electrical power receiving controller device 200 having a power receiving terminal IO200 to receive electrical power applied to the AUX pole of the 3.5 mm jack.

The electrical power transmitting controller device 100 and the electrical power receiving controller device 200 may further be arranged to encode/translate data signals, such as I²C signals, to coded, digitized communication data, such as data words of a bit stream, of another format. The electrical power transmitting/receiving controller device may translate the data signals into data words of a Manchester or other method of mapping binary signal to a physical signal (current or voltage) for transmission over a 1-wire plus ground return interface. The electrical power transmitting controller device 100 and the electrical power receiving controller device 200 may further be arranged to decode/translate coded, digitized communication data coded by a data communication protocol, such as Manchester coding or Hammond coding, into data signals of another format, such as I²C data signals.

Thus, in the communication system of FIG. 1 power is generated in the electrical power transmitting controller device 100 and transferred from the host device 10 to the accessory device 20 by means of the auxiliary pole AUX of the 3.5 mm jack. The power delivered by the electrical power transmitting controller device 100 is used to operate the accessory device 20. Furthermore, communication data in the form of digitized data coded according to a data communication protocol is generated by the electrical power transmitting controller device 100/the power receiving controller device 200 and transferred between the host device 10 and the accessory device 20 via the auxiliary pole AUX of the 3.5 mm jack interface.

In operation, the host device 10 detects whether the electrical power receiving controller device 200/the accessory device 20 is coupled to the electrical power transmitting controller device 100/the host device 10. If the accessory device 20 is connected to the host device 10, then the electrical power transmitting controller device 100 and the electrical power receiving controller device exchange a supplier identifier and/or a signature which indicates the type of the accessory device to the host device. In a next step a first handshaking procedure is carried out between the electrical power transmitting controller device 100 and the electrical power receiving controller device 200, in which the electrical power transmitting controller device detects whether the accessory device 20 is configured to be supplied with electrical power from the electrical power transmitting controller device 100 to be operated.

If the accessory device 20 is detected as a standard accessory device no power or simple bias power is provided by the host device 10 and supplied to the accessory device 20. If it has been detected that the accessory device is an intelligent accessory device, the electrical power transmitting controller device 100 validates that the accessory device 20 is capable of accepting electrical power from the host device to be operated. If the accessory device is arranged to be supplied with electrical power to be operated from the host device, the electrical power transmitting device 100 provides electrical power to the electrical power receiving controller device 200 of the accessory device 20. The electrical power transmitting controller device 100 is arranged to find out a level of supply current or supply voltage which is necessary to operate the accessory device 20. A voltage/current regulator/generator of the electrical power transmitting controller device 100 then generates the identified level of the supply current or supply voltage and provides the electrical power to the power delivering terminal IO100. The power is then transferred to the accessory device 20 via the auxiliary pole AUX of the 3.5 mm jack interface.

The power transmitting controller device permanently verifies the connection status in order to remove the power from providing at the power delivering terminal IO100 in case that the accessory device is disconnected or uncoupled from the terminal IO10. Furthermore, the power transmitting controller device 100 verifies the correct operation of the accessory device in real time to judge for any faults or degraded modes of operation. If the electrical power transmitting controller device 100 detects any faults/degraded modes in operation of the accessory device 20, the power transmitting controller device 100 interrupts the provision of power at the power delivering terminal IO100.

According to another embodiment the electrical power transmitting controller device 100 is arranged to detect whether the accessory device 100 is configured to receive communication data coded by a data communication protocol. If the electrical power transmitting controller device 100 has detected that the accessory device 20 is configured to receive coded data, the electrical power transmitting controller device 100 translates/encodes data signals, such as I²C data signals or analogue data signals, into coded, digitized data which are then provided at the power delivering terminal IO100/the external terminal IO10 to be transferred via the auxiliary pole AUX of the 3.5 mm jack IO20 to the electrical power receiving controller device 200/the accessory device 20. The electrical power receiving controller device 200 translates/decodes the coded, digitized communication data into data signals of another format, such as I2C signals, or into analogue data signals and provides the decoded data signals to the accessory device 20. According to this embodiment the communication link is configured as an unidirectional communication link.

The communication link may also be configured as a bidirectional link. The electrical power receiving controller device 20 translates/encodes data signals of a first format into coded, digitized communication data of a second format which are transferred via the AUX pole of the 3.5 mm jack interface to the power transmitting controller device 10. The power transmitting controller device 10 is arranged to translate/decode the coded communication data of the second format into data signals of the first format.

Figure 2:
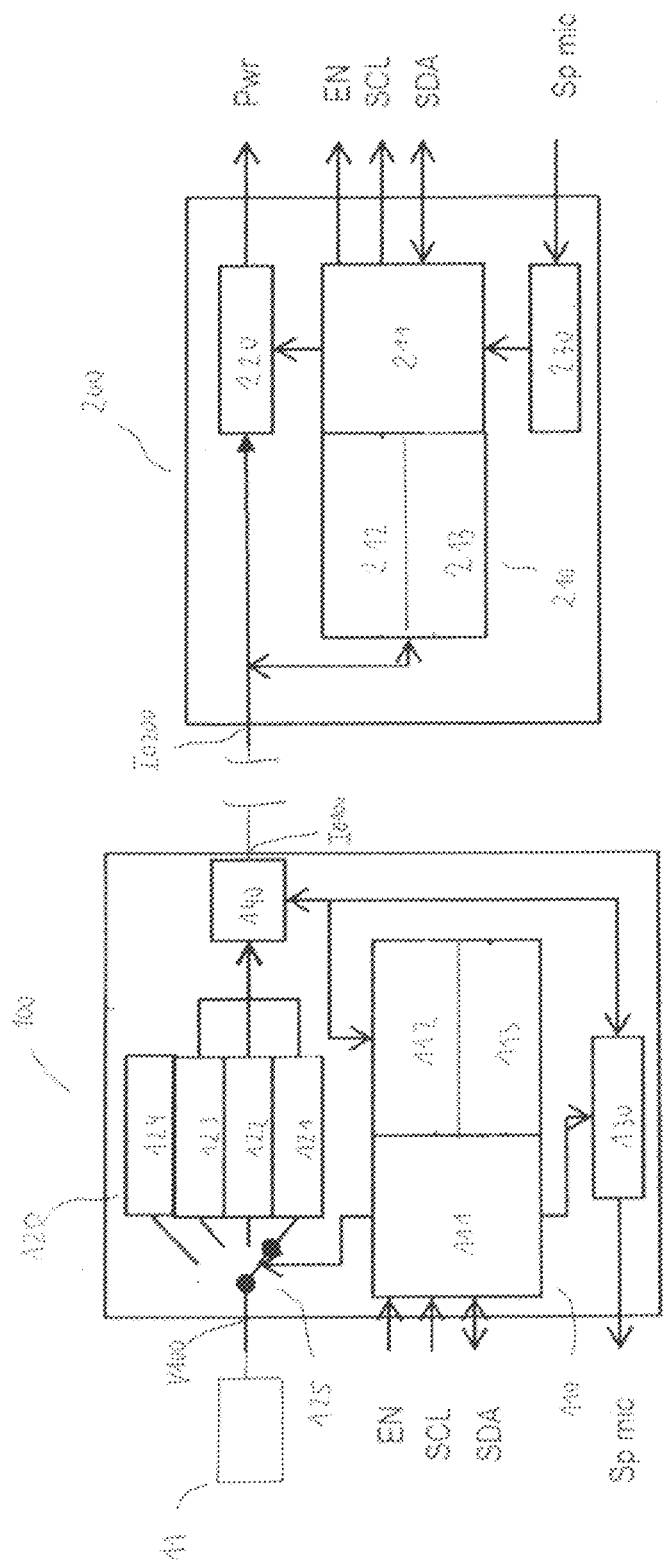
FIG. 2 shows an embodiment of an electrical power transmitting controller device and an electrical power receiving controller device being coupled by a communication path.

FIG. 2 shows an embodiment of the electrical power transmitting controller device 100 and the electrical power receiving controller device 200 in greater detail. The electrical power transmitting controller device 100 may comprise a control unit 110 which is connected to terminals EN, SCL, SDA. The terminals are configured to apply/provide a data signal, such as the I²C data signal. The control unit 110 comprises an encoding unit 111 for encoding data signal of a first format into coded digitized data of a second format being coded by a data communication protocol, a decoding unit 112 to decode coded digitized data of the second format having a data communication protocol to data signals of the first format.

The electrical power transmitting controller device 100 further comprises a controllable switch unit 120 which is coupled to the power delivering terminal IO100 and a supply terminal V100 to apply a supply voltage. The supply terminal V100 may be coupled to a voltage source 11. The controllable switch unit 120 may comprise a voltage regulator or voltage generator 121 to generate a constant, fixed voltage level at the power delivering terminal IO100. The controllable switch unit 110 further may contain a pull-up resistor 122, a bypass-path 123 and an interrupted/non-connected path 124. The switch unit 120 comprises a controllable switch 125. The switch setting of the controllable switch 125 may be controlled by the control unit 110.

The controller unit 110 further comprises a storage unit 113 to store an identifier to identify the electrical power transmitting controller device and a buffer unit 130. Speech data received at the power delivering terminal IO100 may be stored in the buffer unit 130 before being outputted at a terminal Sp mic for being further processed by the host device.

The electrical power receiving controller device 200 comprises a control unit 210 including an encoding unit 211 to encode data signals of the first format, such as an I²C signal or analogue data signals, received at terminals EN, SCL and SDA, into coded digitized communication data of a data communication protocol of the second format, such as a Manchester or other method of mapping a binary signal to a physical signal (current or voltage) for transmission over a 1-wire plus ground return interface, and to provide the coded data of the second format at the power receiving terminal IO200. The control unit 210 further comprises a decoding unit 212 to decode the coded digitized communication data of the second format received at the power receiving terminal IS200 and to provide data signals of the first format at the terminals EN, SCL, SDA. The control unit 210 further comprises a storage unit 213 to store a signature and/or an identifier to identify the electrical power receiving controller device.

The power receiving terminal IO200 is connected to a switch unit 220 which is controlled by the control unit 210. The switch unit 220 may interrupt a path between the power receiving terminal IO200 and a power-out terminal Pwr or connect the power receiving terminal IO200 to the power-out terminal Pwr. Speech data of a microphone of the accessory device 20 received at a terminal Sp mic is amplified by an amplifier 230 before being transferred via the auxiliary pin AUX of the 3.5 mm jack to the electrical power transmitting controller device 100.

In operation, the electrical power transmitting controller device 100 detects when the socket IO10 is first occupied. Then the electrical power transmitting controller device starts with the identification process to identify the accessory device 20. For this purpose, the identifier and/or the signature of the accessory device 20 stored in the storage unit 213 is read out by the power transmitting controller device 100. The accessory device may comprise an ID-resistor. The resistance of the ID-resistor may be measured by the power transmitting controller device 100 via an initial current. Depending on a value of the determined resistance, the power transmitting controller device recognizes, if the accessory device is a conventional accessory device, such as an electromechanical headset, or an intelligent accessory device, e.g. a headset with a microcontroller. The microcontroller may be provided for controlling noise cancelling, 3D sound effects etc.

After the identification process the control unit 110 recognizes the type of the accessory device, i.e. the control unit 110 recognizes whether the accessory device 20 is a conventional accessory device or an intelligent accessory device. In the same way the identifier and/or signature of the host device 10 stored in the storage unit 113 may be read out by the power receiving controller device 200 to recognize the type of the host device 10.

If the control unit 110 detects that the accessory device 20 is a conventional component, the control unit 110 controls the switch 125 such that microphone power is coupled to the power delivering terminal IO100 via the pull-up resistor 122 or the bypass-path 123. In this case all other analogue functions such as microphone and loudspeaker functions, are routed conventionally. If analogue functions are provided in the host device 10, for example microphone amplifiers, filters, expansion/compression functions, then the host device is awake and available to program settings and gain from a main microprocessor of the host device.

If the control unit 110 detects that the accessory device 20 is an intelligent component, a handshaking procedure is performed between the electrical power transmitting controller device 100 and the electrical power receiving controller device 200 to determine the power requirements of the accessory device. If it is detected that the intelligent accessory device is power supplied by a battery of the accessory device, the controllable switch unit 125 is controlled such that the connection between the supply terminal V100 and the power delivering terminal IO100 is interrupted via the interrupted/non-connected path 124.

If, after finishing the handshaking procedure, it is detected that the intelligent accessory device 20 is arranged to be power supplied by the host device 10, the control unit 110 controls the switch 125 such that the supply terminal V100 is connected to the power delivering terminal IO100 via the voltage regulator/generator 121. The voltage regulator/generator 121 is arranged to provide a fixed voltage level generated from the voltage source 11 at the power delivering terminal IO100. The control unit 210 of the electrical power receiving controller device 200 controls the switch unit 220 such that the power receiving terminal IO200 is conductively connected to the power-out terminal Pwr of the accessory device 20. The host device 10 delivers electrical power to the accessory device 20 to operate the accessory device. The electrical power is provided and transferred via the auxiliary pole AUX of the 3.5 mm jack IO20.

In a subsequent step the communication link between the host device 10 and the accessory device 20 is activated. Data signals received from the host device 10, for example as I²C data signals, are translated into coded digitized communication data of a data protocol by the encoder 111. The coded data are transferred via the auxiliary pole AUX of the 3.5 mm jack interface to the accessory device. The decoder 212 decodes the received coded data words and translates the words of the received bit stream into data signals delivered to the accessory device 20 as I²C data signals at the terminals EN, SCL, SDA.

In case of a bidirectional communication link, the encoder 211 may encode the I²C data signals received from the accessory device at the terminals EN, SCL and SDA into coded digitized data of another communication protocol. The words of the coded bit stream is provided at the power receiving terminal IO200 and transferred via the auxiliary pole AUX of the 3.5 mm jack interface to the host device 10. The decoder 112 of the power transmitting controller device 100 decodes the received data words of the bit stream and provides I²C data signals for the host device 10 at terminals EN, SCL and SDA. During the uni- or bidirectional communication process a handshaking procedure is permanently performed between the host device 10 and the accessory device 20 to verify the correct connection status and to judge for faults or degraded modes of operation.

Figure 3:
FIG. 3 illustrates a communication protocol used for coding communication data transferred between a host device and an accessory device.

FIG. 3 illustrates a communication protocol according to which communication data are exchanged between the host device 10 and the accessory device 20. The communication protocol comprises three stages: a reset sequence RS, a ROM command sequence RCS and multiple function sequences FS_01, . . . , FS_0n.

The reset sequence RS comprises a master reset pulse MRP provided by the electrical power transmitting controller device 100 and a slave reset pulse SRP provided as an answer signal from the electrical power receiving controller device 200. The reset pulse is sent from the host device to set a known state in the slave, i.e. the accessory device 20. The reset sequence may also include a logical slave presence detection.

Then, a ROM command sequence comprising ROM commands and a ROM identifier may be transferred. The ROM command sequence may be used by the host device 10 to configurate the accessory device. If the host device 10 recognizes that the the current configuration of the accessory device 20 is out of date, the ROM command sequence is transferred via the AUX pole of the 3.5 mm jack interface to the accessory device and enables to carry out a software-update in the accessory device 20.

After the ROM command sequence has been transferred, function sequences FS_01, . . . , FS_0n are transferred between the power transmitting controller device 100 and the power receiving controller device 200. Each function sequence may comprise an n-bit-forward command FC and read-write data RWD. The function sequences may include commands to control the function of the accessory device or to control the function of the host device.

LIST OF REFERENCE SIGNS 1 communication system
10 host device
11 voltage source
20 accessory device
100 electrical power transmitting controller device
110 control unit
111 encoding unit
112 decoding unit
113 storage unit
120 controllable switch unit
121 voltage regulator/generator
130 buffer unit
200 electrical power receiving controller device
210 control unit
211 encoding unit 212 decoding unit
213 storage unit
220 controllable switch unit
230 amplifier unit

The invention claimed is:

1. An electrical power transmitting controller device for using in a host device to transmit electrical power to an electrical power receiving controller device of an accessory device, comprising:
    a power delivering terminal (IO100) to provide electrical power, wherein the power delivering terminal (IO100) is arranged to be coupled to the electrical power receiving controller device (200) of the accessory device (20),
    wherein the electrical power transmitting controller device (100) is arranged to detect whether the electrical power receiving controller device (200) of the accessory device (20) is coupled to the power delivering terminal (IO100), and whether the accessory device (20) is arranged to be supplied with electrical power from the electrical power transmitting controller device (100) to be operated,
    wherein the electrical power transmitting controller device (100) is arranged to provide electrical power at the power delivering terminal (IO100) to operate the electrical power receiving controller device (200), if the electrical power transmitting controller device (100) detects that the electrical power receiving controller device (200) of the accessory device (20) is coupled to the power delivering terminal (IO100) and that the accessory device (20) to be operated is arranged to be supplied with power from the electrical power transmitting controller device (100),
    wherein the power delivering terminal (IO100) is arranged to provide and receive communication data,
    wherein the electrical power transmitting controller device (100) is arranged to detect whether the accessory device (10) is arranged to receive communication data coded by a data communication protocol, and
    wherein the electrical power transmitting controller device (100) is arranged to provide and receive the communication data coded by the data communication protocol at the power delivering terminal (IO100), if the electrical power transmitting controller device (100) detects that the accessory device (20) is arranged to exchange the communication data coded by the data communication protocol.

2. The electrical power transmitting controller device as claimed in claim 1, wherein the electrical power transmitting controller device (100) is arranged to verify a connection status of a connection of the accessory device (20) to the power delivering terminal (IO100) and to interrupt providing power at the power delivering terminal (IO100), if the electrical power transmitting controller device (100) detects that the accessory device (20) is decoupled from the power delivering terminal (IO100), and
    wherein the electrical power transmitting controller device (100) is arranged to verify an operation mode of the accessory device (20) in real time and to interrupt providing power at the power delivering terminal (IO100), if the electrical power transmitting controller device (100) detects any fault in operation of the accessory device (20).

3. The electrical power transmitting controller device as claimed in claim 1, comprising:
    a supply terminal (V100) to couple a supply voltage source (11) to the electrical power transmitting controller device (100); and
    a controllable switch unit (120) to selectively connect and disconnect the supply terminal (V100) to/from the power delivering terminal (IO100) and to connect the supply terminal (V100) to a power regulator/generator (121) to generate power at the power delivering terminal (IO100).

4. The electrical power transmitting controller device as claimed in claim 1, comprising:
    an encoding unit (111) to encode a data signal (SDA, SCL) of a first format applied to the encoding unit (111) into the communication data of a second format having the data communication protocol; and
    a decoding unit (112) to decode the communication data of the second format having the data communication protocol applied to the decoding unit (112) into the data signal (SDA, SCL) of the first format,
    wherein the encoding unit (111) is coupled to the power delivering terminal (IO100) to provide the communication data to the power delivering terminal (IO100), and
    wherein the decoding unit (112) is coupled to the power delivering terminal (IO100) to receive the communication data at the power delivering terminal (IO100).

5. The electrical power transmitting controller device as claimed in claim 1, wherein the electrical power transmitting controller device (100) is arranged to generate the communication data of the data communication protocol by modulating a current or a voltage with a fixed frequency.

6. The electrical power transmitting controller device as claimed in claim 1, wherein the power delivering terminal (IO100) is arranged to be coupled to a 3.5 mm jack interface, and in particularly such that the power and/or the communication data are provided to an auxiliary pole (AUX) of a 3.5 mm jack interface (IO20).

7. A host device to provide power to an accessory device, comprising:
    an external terminal (IO10) to provide power, wherein the external terminal (IO10) is arranged to insert a 3.5 mm jack interface (IO20) of the accessory device (20) into the external terminal (IO10); and
    an electrical power transmitting controller device (100) as claimed in claim 1,
    wherein the power delivering terminal (IO100) of the electrical power transmitting controller device (100) is connected to the external terminal (IO10) of the host device (10), and
    wherein the external terminal (IO10) is arranged such that power provided by the electrical power transmitting controller device (100) is provided to the auxiliary pole (AUX) of the 3.5 mm jack interface (IO20).

8. The host device as claimed in claim 7, wherein the external terminal (IO10) is arranged to receive and provide communication data, and
    wherein the external terminal (IO10) is arranged such that communication data provided by the electrical power transmitting controller device (100) is provided to the auxiliary pole (AUX) of the 3.5 mm jack interface (IO20).

9. An electrical power receiving controller device for using in an accessory device to receive power from an electrical power transmitting controller device of a host device, comprising:
    a power receiving terminal (IO200) to receive electrical power, wherein the power receiving terminal (IO200) is arranged to receive power from the electrical power transmitting controller device (100) of the host device (10) to be supplied to the accessory device (20);

a control unit (210) to perform handshaking operations between the electrical power receiving controller device (200) of the accessory device (20) and the electrical power transmitting controller device (100) of the host device (10); and a controllable switch unit (220) to selectively provide power received at the power receiving terminal (IO200) to the accessory device after the handshaking operations are performed or to separate power from the accessory device (20) before the handshaking operations are performed.

10. The electrical power receiving controller device as claimed in claim 9, comprising:

an encoding unit (211) to encode a data signal (SDA, SCL) of a first format applied to the encoding unit (211) into communication data of a second format having a data communication protocol; and a decoding unit (212) to decode the communication data of the second format having the data communication protocol into the data signal (SDA, SCL) of the first format, wherein the power receiving terminal (IO200) is arranged to receive and provide the communication data, wherein the encoding unit (211) is coupled to the power receiving terminal (IO200) to provide the communication data to the power receiving terminal (IO200), and wherein the decoding unit (212) is coupled to the power receiving terminal (IO200) to receive the communication data at the power receiving terminal (IO200).

11. The electrical power receiving controller device as claimed in claim 9 or 10, wherein the power receiving terminal (IO200) is arranged to be connected to a 3.5 mm jack interface (IO20), and in particular such that power is received at the auxiliary pole (AUX) of the 3.5 mm jack interface (IO20) and the communication data is received from and provided to the auxiliary pole (AUX) of the 3.5 mm jack interface (IO20).

12. An accessory device with receiving power from a host device, comprising:

an electrical power receiving controller device (200) as claimed in claim 9; and a 3.5 mm jack interface (IO20), wherein the power receiving terminal (IO200) of the electrical power receiving controller device (200) is coupled to the 3.5 mm jack interface (IO20) such that the power is received at the auxiliary pole (AUX) of the 3.5 mm jack interface (IO20).

13. The accessory device as claimed in claim 12, wherein the accessory device (20) is arranged to receive and/or provide communication data having a data communication protocol, and wherein the power receiving terminal (IO200) of the electrical power receiving controller device (200) is coupled to the 3.5 mm jack interface (IO20) such that the communication data is received at and/or provided to the auxiliary pole (AUX) of the 3.5 mm jack interface (IO20).

14. A communication system, comprising:

a host device (10) as claimed in claim 7; and an accessory device (20), with receiving power from the host device (10), comprising:

an electrical power receiving controller device (200) comprising:

a power receiving terminal (IO200) to receive electrical power, wherein the power receiving terminal (IO200) is arranged to receive power from the electrical power transmitting controller device (100) of the host device (10) to be supplied to the accessory device (20);

a control unit (210) to perform handshaking operations between the electrical power receiving controller device (200) of the accessory device (20) and the electrical power transmitting controller device (100) of the host device (10); and a controllable switch unit (220) to selectively provide power received at the power receiving terminal (IO200) to the accessory device after the handshaking operations are performed or to separate power from the accessory device (20) before the handshaking operations are performed; and a 3.5 mm jack interface (IO20), wherein the power receiving terminal (IO200) of the electrical power receiving controller device (200) is coupled to the 3.5 mm jack interface (IO20) such that the power is received at the auxiliary pole (AUX) of the 3.5 mm jack interface (IO20), and wherein the external terminal (IO10) of the host device (10) and the 3.5 mm jack interface (IO20) of the accessory device (20) are arranged to be connected to each other.

* * * * *